D. U. POWELL & J. W. HARDWICK.
HIGH PRESSURE PIPE SADDLE.
APPLICATION FILED MAY 4, 1914.
1,131,003.
Patented Mar. 9, 1915.
2 SHEETS—SHEET 1.
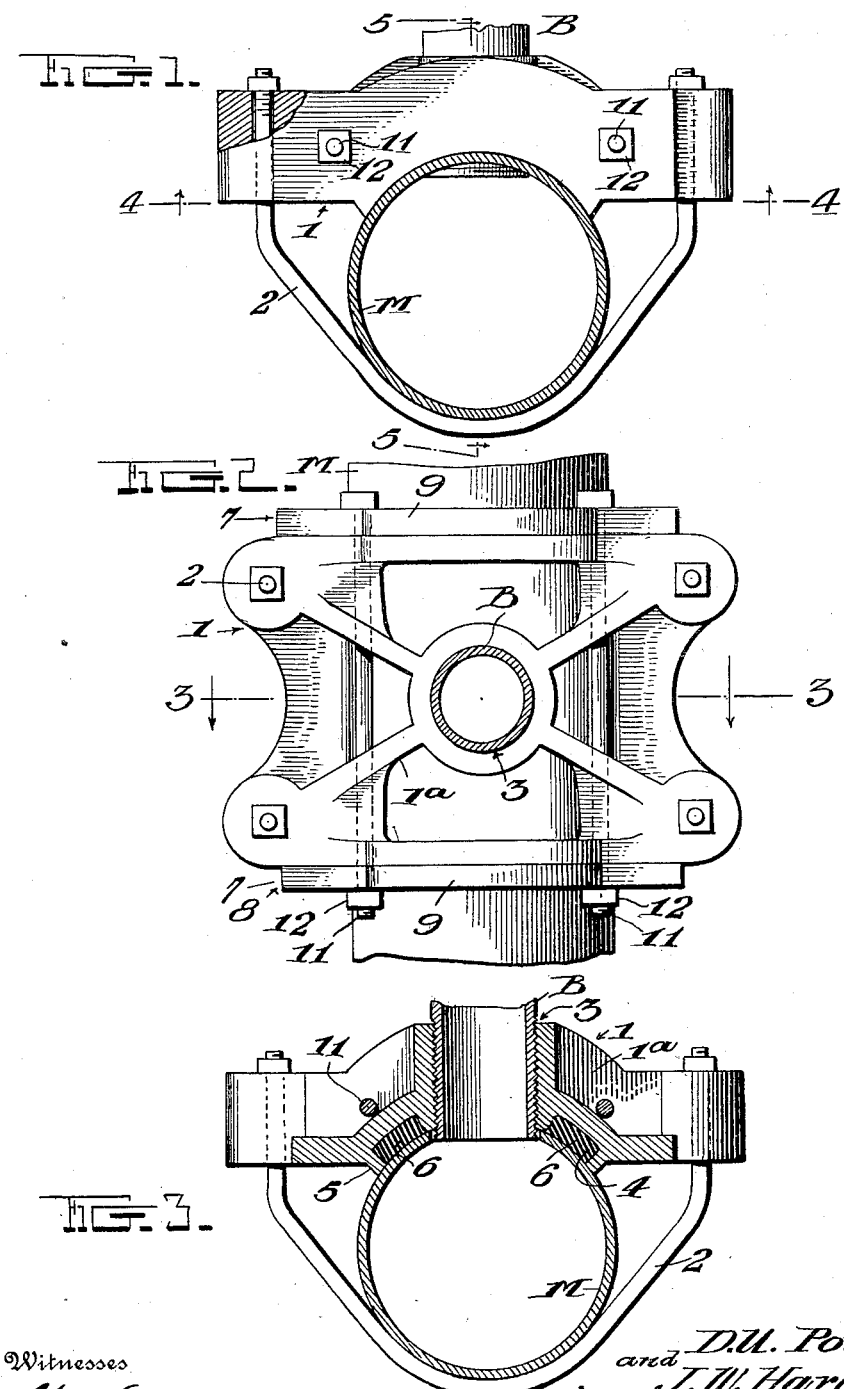
Witnesses
H. Woodard
Inventors
D. U. Powell
and J. W. Hardwick
By H. B. Willson & Co.
Attorneys

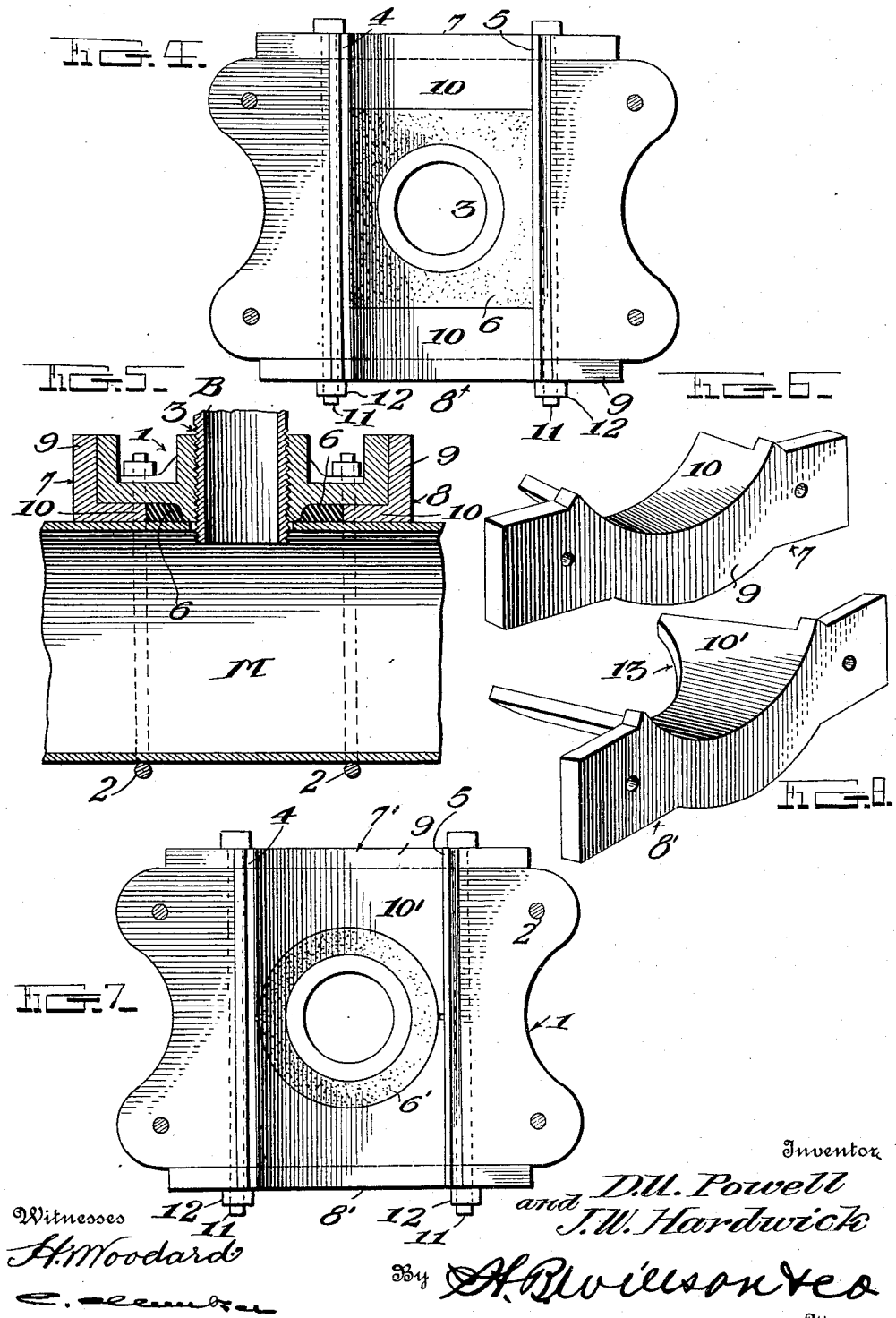

UNITED STATES PATENT OFFICE.

DALTON U. POWELL AND JOHN W. HARDWICK, OF CAMBRIDGE, OHIO.

HIGH-PRESSURE-PIPE SADDLE.

1,131,003.  Specification of Letters Patent.  Patented Mar. 9, 1915.

Application filed May 4, 1914. Serial No. 836,246.

*To all whom it may concern:*

Be it known that we, DALTON U. POWELL and JOHN W. HARDWICK, citizens of the United States, residing at Cambridge, in the county of Guernsey and State of Ohio, have invented certain new and useful Improvements in High-Pressure-Pipe Saddles; and we do declare the following to be a full, clear, and exact description of the invention, such as will enable others skilled in the art to which it appertains to make and use the same.

This invention relates to improvements in pipe saddles and more especially to saddles to be used on high pressure gas or water mains for connecting branch pipes or laterals thereto.

In tapping pipe lines, particularly such as are used for conveying gas, to connect a branch or lateral therewith, a fitting or connection designated as a "saddle" is used, the same being clipped to the main line and the branch or lateral coupled to the saddle. A tight joint is obtained between the saddle and the main pipe to prevent leakage by the interposition of a washer or suitable packing of any desired or suitable material. This packing is frequently blown out by the high pressure entailing loss and serious inconvenience.

The object of the invention is to provide a structure for holding the packing under both transverse and longitudinal compression and thereby prevent displacement or blowing out of the packing and insuring a fluid tight connection between the saddle and the main.

With the above objects in view, the invention consists of certain novel features of construction, combination and arrangement of parts as will be more fully described and claimed.

In the accompanying drawings: Figure 1 represents a transverse section through a pipe main showing this improved saddle applied thereto in end elevation, with parts broken out; Fig. 2 is a top plan view thereof with the branch pipe shown in section; Fig. 3 is a transverse vertical section taken on the line 3—3 of Fig. 2; Fig. 4 is a horizontal section taken on the line 4—4 of Fig. 1, looking in the direction of the arrow; Fig. 5 is a longitudinal section thereof; Fig. 6 is a detail perspective view of one of the followers used in the form of the invention shown in Figs. 1 to 6; Fig. 7 is a horizontal section similar to Fig. 4 showing another form of packing and follower used in connection therewith; and Fig. 8 is a detail perspective view of a modified form of follower.

The saddle fitting or connection 1 may be of ordinary construction depending upon the size of the pipe for which it is intended and the particular nature of the work. This saddle is adapted to be secured to the main M by means of clips or stirrup bolts 2, which pass through reinforced openings provided in edge portions of the saddle. The branch pipe B to be coupled to the main line M is fitted into a flanged central opening 3 in the saddle and is preferably secured in position by screw threads as is shown clearly in Figs. 3 and 5. The inner or seating face of the saddle is concave to conform to the periphery of the main pipe and is provided with longitudinally extending ribs 4 and 5, the purpose of which is to prevent lateral displacement of the packing to be described. Between these ribs 4 and 5 around the central opening 3, a packing 6 is adapted to be secured which is thicker than the ribs 4 and 5 and therefore when the saddle is drawn down to the pipe M by the stirrup bolts 2, the gasket or packing 6 is compressed laterally.

Slidably mounted in the ends of the saddle are two followers 7 and 8 which are guided by the ribs 4 and 5 which ribs are undercut to form grooves for receiving the followers. These followers comprise end plates 9 which are adapted to abut against the ends of the saddle and have curved flanges 10 extending laterally inward therefrom, the ends of said flanges being slidably engaged with the ribs 4 and 5 and between the inner edges of which the packing 6 is adapted to lie and to be compressed thereby in a longitudinal direction which causes the packing to expand transversely and be compressed transversely by the ribs 4 and 5 against which the packing abuts. This inward movement of the followers also forces the packing out against the face of the main pipe M and insures a fluid tight connection between the saddle and said pipe. Clamping bolts 11 extend through the ends of the plates 9 and through the webs 1ᵃ of the saddle as is clearly shown in Fig. 2, said bolts being provided with tightening nuts 12 which when screwed home, draw the followers toward each other and exert a clamping or compressing action on the packing.

The packing shown in Figs. 1 to 6 is in the form of a rectangle having a central opening but it is obvious that any other form of packing may be used such for instance as that shown in Fig. 7 which is in the form of an annulus 6' and is held and compressed by the followers 7' and 8' which are similar to those shown in the other figures except that the flanges 10' thereof have their inner edges curved as shown at 13 to conform to the curved edge of the packing.

The packings 6 and 6' may be of lead or other soft metal, rubber, leather or any material suitable for the purpose.

In practice, the main pipe M after being attached, has the packing and saddle fitted thereto, the packing projecting laterally beyond the confining ribs 4 and 5 and upon tightening the clips or stirrups bolts 2, this packing is compressed laterally or in a direction of its thickness and expands laterally and fills the space formed between the confining ribs and the flange which surrounds the central opening in the saddle and at the same time conforms to the surface of the pipe M. The followers are then drawn inwardly by tightening the nuts 12 on the bolts 11 and the inner edges thereof engaging the packing compresses it longitudinally and these followers, together with the ribs 4 and 5, limit the expansion of the packing and in practice, prevent displacement thereof either laterally or longitudinally whereby blowing out of the packing is prevented when subjected to high internal pressure.

We claim as our invention:

1. A pipe saddle provided with a concave inner face to conform to the peripheral portion of the pipe and having an opening extending centrally therethrough, ribs extending longitudinally of said saddle on opposite sides of said opening, a packing arranged around said opening between said ribs, and followers slidable longitudinally on said saddle between said ribs.

2. A pipe saddle having a packing seat arranged on one face thereof, a packing disposed in said seat, and removable and fixed means for compressing said packing longitudinally and transversely respectively.

3. A pipe saddle having a concave inner face with a central opening therein provided with a surrounding flange, a packing adapted to encircle said opening, and means for compressing said packing in directions at right angles to each other, one of said means being movable and the other being fixed.

4. A pipe saddle having a concave inner face with a central opening therein provided with a surrounding flange, a packing adapted to encircle said opening, and means for compressing said packing in directions at right angles to each other, one of said means being fixed and carried by said saddle and the other being movable, and means for adjusting said movable means.

5. A pipe saddle having a concave inner face with an opening extending therethrough, a flange surrounding said opening, ribs extending longitudinally of said saddle on opposite sides of said opening, and followers operable between said ribs for compressing said packing in one direction.

6. A pipe saddle having its inner face shaped to fit the pipe to which it is to be applied and provided with an opening therethrough, longitudinally extending undercut spaced ribs on said saddle and followers having flanges the ends of which are slidably engaged with said ribs, and means for moving said followers toward or away from each other.

In testimony whereof we have hereunto set our hands in presence of two subscribing witnesses.

DALTON U. POWELL.
JOHN W. HARDWICK.

Witnesses:
SHERMAN L. POWELL,
J. K. YOUNG.

Copies of this patent may be obtained for five cents each, by addressing the "Commissioner of Patents, Washington, D. C."